Oct. 2, 1951 G. H. DINGMAN 2,569,461
MAGNETO

Original Filed May 23, 1946 3 Sheets-Sheet 1

INVENTOR
Glen H. Dingman
BY
Dale A. Bauer
ATTORNEY

Oct. 2, 1951  G. H. DINGMAN  2,569,461
MAGNETO
Original Filed May 23, 1946  3 Sheets-Sheet 2

INVENTOR
Glen H. Dingman
BY
Dale A. Bauer
ATTORNEY

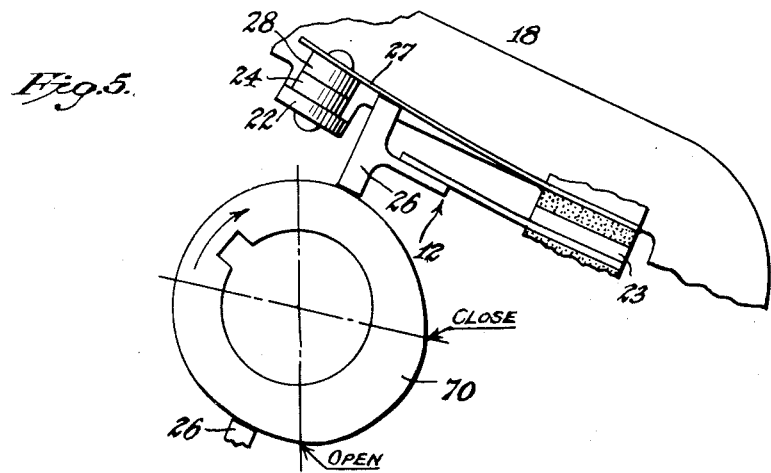
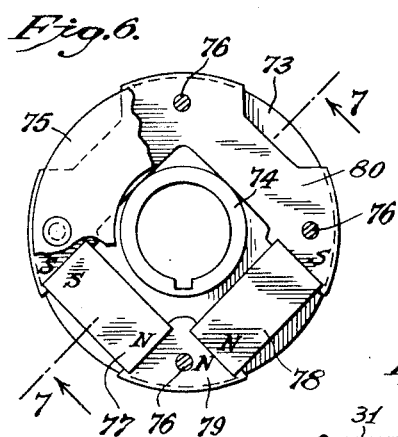
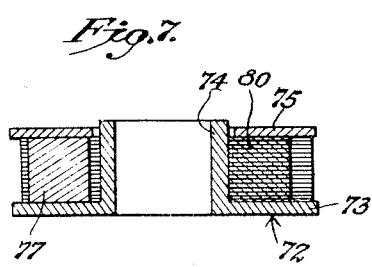
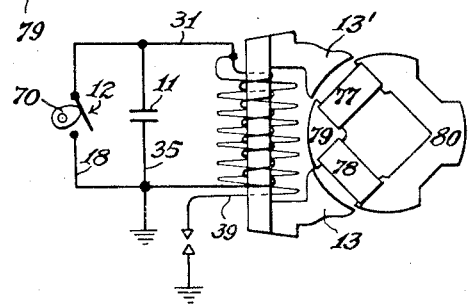

Patented Oct. 2, 1951

2,569,461

UNITED STATES PATENT OFFICE 2,569,461

MAGNETO

Glen H. Dingman, Sidney, N. Y., assignor to Bendix Aviation Corporation, New York, N. Y., a corporation of Delaware Original application May 23, 1946, Serial No. 671,695. Divided and this application February 9, 1950, Serial No. 143,203

12 Claims. (Cl. 171—209)

1

This invention relates to magnetos and more particularly to the mechanical construction thereof and the mounting thereof on an engine casing or the like.

This application is a division of applicant's copending application Ser. No. 671,695 filed May 23, 1946, for Magneto.

One of the objects of the present invention is to provide a mounting for the parts of a magneto adapted to make the assembly of parts easy and efficient.

Another object of the invention is to provide novel means for mounting a magneto stator on an engine casing or the like whereby the magneto may be readily installed or removed from the casing and whereby adjustment of the magneto relative to the casing is greatly facilitated.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a plan view of a flywheel or crankshaft type of magneto with the cam and shaft, and the rotor omitted;

Fig. 5 is a schematic detail plan view showing the cam and its operative relation to the breaker points located at diametrically opposite positions;

Fig. 6 is a bottom plan view of the rotor broken away to show concealed parts;

Fig. 7 is a section of same on the line 7—7 of Fig. 6; and

Fig. 8 is a diagram of the circuits.

Figure 1:
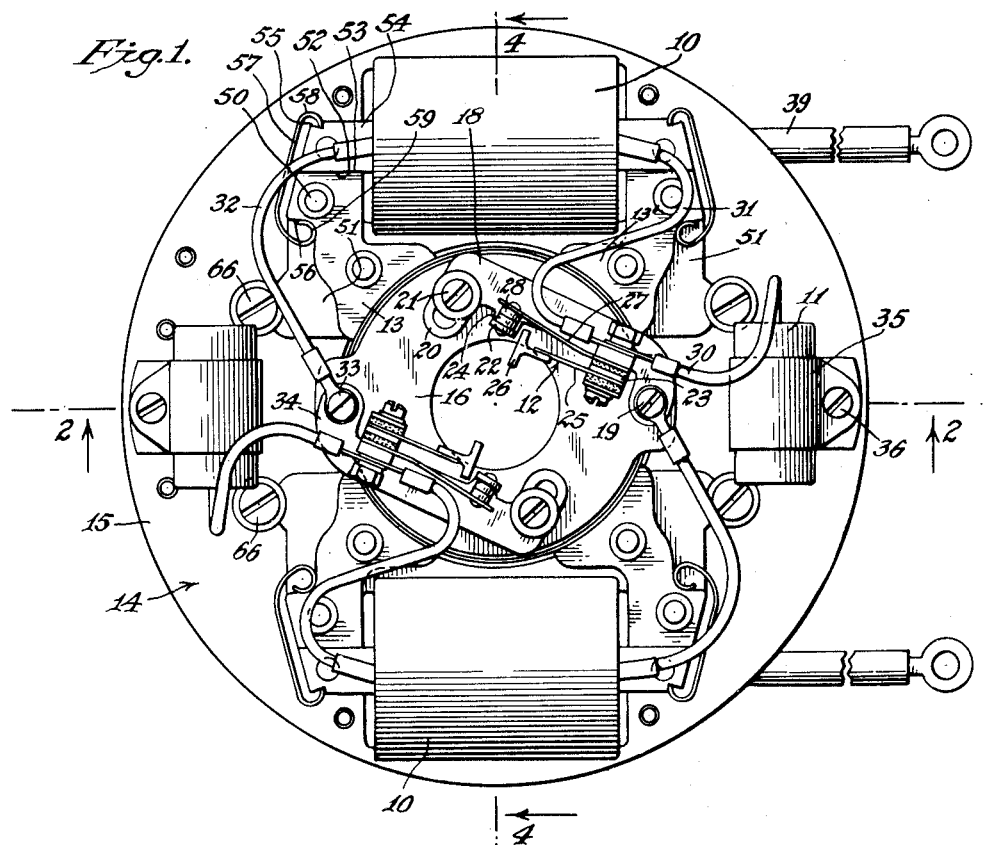

Referring to the numerals of the drawings, and particularly to Fig. 1, a magneto transformer is indicated by the numeral 10, its associated condenser by the numeral 11, its associated circuit breaker by the numeral 12, and its stator pole shoes by the numerals 13, 13'. These operative parts of the magneto are duplicated, but the initial description will be limited to them since the operation of the duplicates is identical, occurring, in the construction shown, 180° later.

The frame 14 of the magneto comprises a cast-

2 ing, which may be of aluminum or any other satisfactory metal or material of sufficient strength and the requisite conductivity, having coaxial annuli 15, 16 of which the smaller has outer dimensions approximating the inner dimensions of the larger and is supported therefrom by integral flat posts 17, 17'.

The smaller annulus 16 carries a metal arm 18 pivotally attached thereto by a screw 19 and having a slotted end 20 through which a set screw 21 passes, giving adjustability to the position of the arm and the breaker elements mounted thereupon. Two metal ears 22, 23 project upwardly from the body of the arm 18, the first of which serves as a support for breaker point 24 and the second of which serves as a support for spring 25 which carries on its end a T-shaped dielectric cam follower 26. The cam follower rides upon the cam carried by the shaft and is displaced by the lobe of the cam toward the spring breaker arm 27, which carries at its end a breaker point 28 which is normally in contact with breaker point 24, acting under the impulse provided by the cam to break the circuit through the points in the manner which will be understood by persons skilled in the art. The breaker arm 27 is electrically connected to the terminal of a cable 30 of the condenser 11 and to the terminal of a cable 31 that issues from the coil 10. The coil is grounded through the cable 32 affixed at its terminal to the screw 33 that attaches the supporting arm 34 of the other breaker to the frame or support 14. The condenser 11 is grounded and fastened to the frame by a strap 35 which encircles it and has its ends affixed to the plate 15 by a screw 36.

A mounting for the coil 10 is provided. As will be understood by persons skilled in the art, the coil has three leads, one to the primary, one to the secondary, and a joint lead to the ground. One of these leads is brought out, in the coil being described, through the circular wall of the coil and poses a problem of protection which has been cared for in a novel manner. A depressed and apertured seat 37 is provided, the curvature of which conforms to that of the coil. The depressed seat has two halves that are separated by an aperture or slot 38 that is seen from the bottom in Fig. 3. The shape of the seat provides end abutments which act to retain the coil against endwise displacement. A high tension lead 39 projects from the wall of the coil and is received in the aperture in the seat.

In order that the lead and the coil itself may be protected against damage from the metal of the frame, from vibration, and from shock, a protective pad 40 is provided. That pad is preferably made from a flexible dielectric substance such as rubber having a flat or curved bed 41 that overlies the coil and conforms to the shape of the seat. A channel-shaped, depressed portion 42, having width about equal to the width of the aperture in the seat and length and depth sufficient to enclose the lead 39 is provided. An opening 43 is provided in the end of the channel-shaped portion 42, beneath the plate 15 through which the high tension lead is passed. The hole in the protective pad may be made to conform snugly to the lead so that vibration of the lead will not harmfully affect the connection to the coil.

The core of the coil is connected to the stator shoes of the magneto. Laminated stator shoes 13, 13' are bolted to the plate 15 by bolts such as 50 in such position that the curved portions thereof are in operative relation to the rotor of the magneto. Raised lands 51, formed integrally with the plate 15, serve to support the stator shoes. The shoes have flat ends 52 adapted to receive the flat sides 53 of the core 54 of the coil 10. Sharp notches 55 are provided in the upper ends of the core 54 and rounded notches 56 are provided in the sides of the stator shoes. Spring clamps 57 having sharp ends 58 and rounded ends 59 are adapted to clamp the ends of the core to the stator shoes in firm electrical connection while at the same time they maintain the coil in its seat in the plate 15. The rounded ends of the clamps are easily sprung into and out of position, but when in place form a firm connection that does not become accidentally disengaged.

Figure 2:
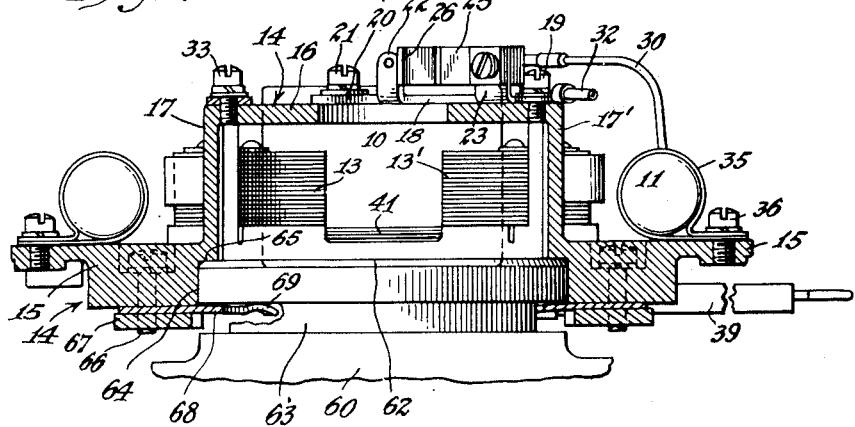
Fig. 2 is a sectional view of the magneto stator taken on the line 2—2 of Fig. 1.
Figure 3:
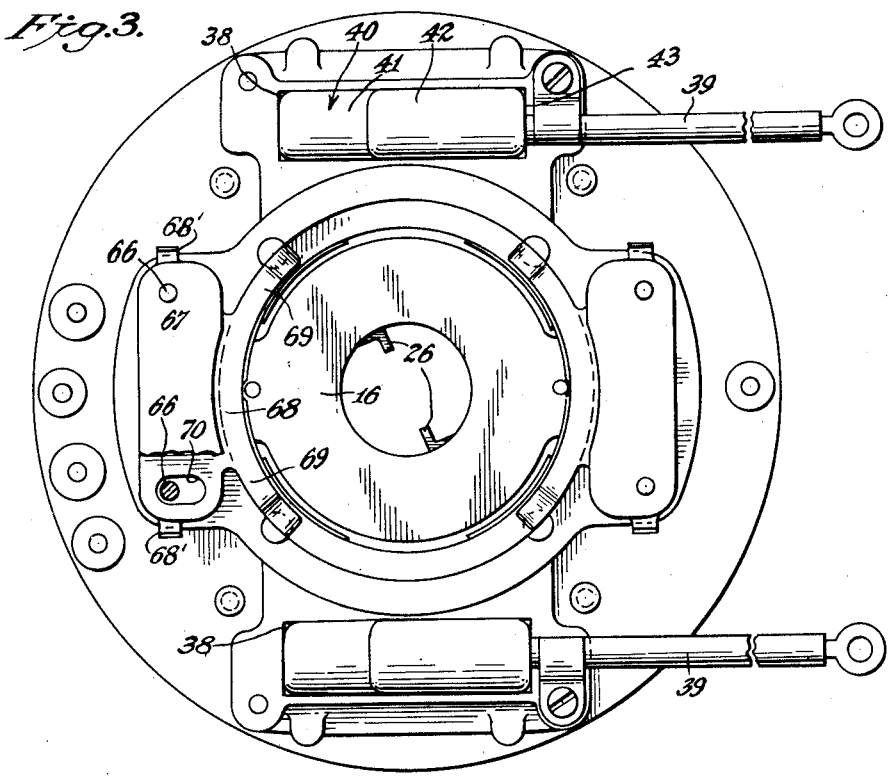
Fig. 3 is a bottom plan view of the structure shown in Fig. 1.
Figure 4:
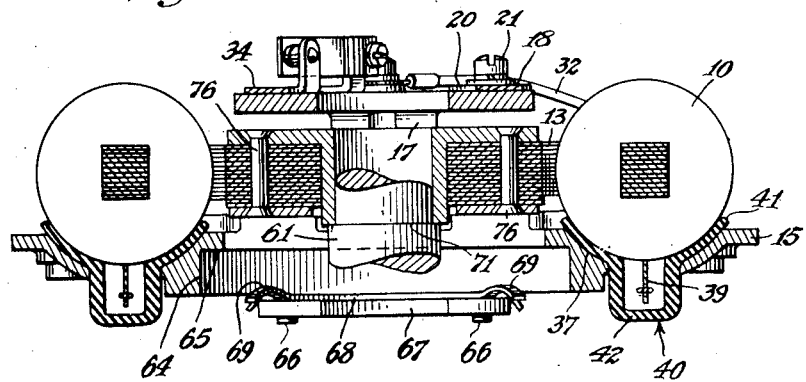
Fig. 4 is a section on the line 4—4 of Fig. 1.

The apparatus hereinabove described forms an interdependent novel combination with the casing 60 (Fig. 2) of the engine or other apparatus from which the drive shaft 61 (Fig. 4) projects. The machine or engine casing 60 has an annular flat top or end 62 and a groove 63 in the wall beneath the top thereby forming a pilot flange. The frame 14 is internally provided with a groove or recess 64, the upper face or end wall 65 of which serves as a shoulder to rest upon or against the end or outer radial wall 62 of the pilot flange of the casing. The annular or cylindrical wall of groove 64 has a diameter substantially equal to that of the pilot flange of the casing 60 and has a depth substantially equal to the distance between the end 62 and groove 63, i. e. the width of the pilot flange as illustrated particularly in Fig. 2. Bolts 66 are mounted in and project freely through the plate 15 and are screw threaded into plate 67 which serves as a nut. Between the plate or nut 67 and the body of plate 15 is an adjustable clamp 68 having circularly projecting spring arms or fingers 69 of curvature substantially conforming to that of groove 64. The arms or fingers 69 have offset cam ends to yieldably engage the inner radial surface of the pilot flange within groove 63. The body portions of the plates 68 have slots 70, as shown in Fig. 3, which permit it to be adjusted to move spring fingers 69 radially into and out of groove 63 for clamping engagement with the pilot flange of casing 60. Clamping plates 68 have outwardly bent tongues 68' at the upper and lower ends thereof, as viewed in Fig. 3, which project beyond the periphery of nut plate 67 and are accessible for facilitating radial movement of the clamping plate when the bolts 66 are not tightened. As many of these clamping plates may be provided as are necessary. Once they are adjusted to groove 63 in casing 60 and, hence, with relation to the pilot flange, they may be fixed into position by tightening the bolts 66, the heads of which are accessible from the upper or outer surface of plate 15.

The cam 70 is mounted on the end of the shaft 61, which projects through the annular plate 16 into operative relation to the circuit breakers. The single lobe of the cam is indicated by the words "Close" and "Open" in Fig. 5. This cam operates the two circuit breaker riders 26 alternately 180° apart so that the spark plugs served by the respective magneto units are fired alternately. By employing a cam of two lobes, the magneto can be made to fire the plugs simultaneously each 180° of arc.

The magneto rotor is seated upon the shaft 61 beneath the cam and in operative alignment with the stator shoes. The shaft 61 has a seat 71 upon which the rotor rests. Both the cam and the rotor are keyed to the shaft.

In Fig. 7, which is a section on the line 7—7 of Fig. 6, the numeral 72 indicates generally the frame of the rotor, which may conveniently be an aluminum casting having an annular plate 73 and a hub 74. The core pieces are laminated and are riveted to the plate 73 by means of brass cover plate 75 and rivets 76. Two magnets, 77 and 78, are arranged at 90° to each other, as indicated in Fig. 6, with their north poles in adjacent position. The north poles of the magnets are seated in appropriate grooves in laminated core piece or shoe 79 which is riveted to the plates 73 and 75. The other ends of the magnets are similarly seated in V-shaped core piece 80, mid-portions of which are cut out to provide three shoes. The middle shoe is substantially inactive so that there are provided by this arrangement a single north and two operative south poles, all of which are located within an arc of 180°. This produces a complete reversal of flux in the coil core once in each revolution of the rotor.

A wiring diagram for single circuit is illustrated in Fig. 8, it being understood that a similar wiring diagram would be provided for the second magneto circuit. No attempt has been made in this diagram to time the cam with relation to the position of the magnets, the particular arrangement being chosen for clarity of representation rather than for operative accuracy. In this figure is shown the rotor with the top plate 75 removed and the cam and breaker displaced to the extremity of the diagram. The ends of the primary and secondary of the coil are connected to the circuit breaker 12 and to the condenser 11, both of which are grounded. The other end of the primary is connected to ground, and the other end of the secondary is connected to a spark plug, which is grounded on the other side of the gap. When the leading end of shoe 80 becomes aligned with the second stator shoe, the shoe 79 is aligned with the first stator shoe and flux passes through the core in one direction. When the shoe 79 reaches the second stator shoe, the following end of shoe 80 reaches the first stator shoe and direction of the flux through the core is reversed. The cam is set on the shaft to make the most efficient use of this arrangement. Adjustment can be made by pivoting the arms 18 to new positions. Additional adjustments can be made by moving the frame 14 clockwise and counter-clockwise on the casing 60.

A particular advantage of this invention is in the construction of the supporting frame and in the means for adjustably supporting it upon the casing of the machine.

Another advantage of the invention is in the novel means of mounting the several parts of the magneto upon each other and upon the frame.

Although only one embodiment of the present invention has herein been illustrated and described, it is to be expressly understood that the same is not limited thereto. Various changes may be made in the design and arrangement of the parts illustrated and in the materials used without departing from the spirit and scope of the invention, as will now be apparent to those skilled in the art. For a definition of the limits of the invention, reference is had primarily to the appended claims.

What is claimed is:

1. A connection comprising an annular body having an annular groove in the curved side beneath the end, a frame having a portion adapted to rest upon the annular body, a plate attached to the frame in proximity to the annular body having circularly projecting arms with offset, cam-like ends adapted to enter said groove, and means to adjust said plate and to fix it in adjusted position.

2. A stator for a magneto comprising a frame having an annular recess for receiving a circular pilot flange on a support, said flange having inner and outer radial surfaces, and means for securing said frame against axial movement relative to said flange and for frictionally holding the same against relative angular movement, said means including a plurality of plates having spring fingers extending therefrom for frictional engagement with the inner radial surface of said flange and screws and nuts clamping said plates to said frame.

3. Apparatus as defined in claim 2 wherein each screw extends freely through the frame and plate for threaded engagement with a nut.

4. Apparatus as defined in claim 3 wherein the heads of the screws are accessible from the side of the frame opposite said recess.

5. Apparatus as defined in claim 2 wherein the screws extend freely through the frame and plates, the openings in said plates through which the screws extend being elongated to permit radial movement of the plates when the same are not clamped by said screws and nuts, whereby said spring fingers may be moved into and out of axial alignment with the pilot flange on the support.

6. Apparatus as defined in claim 5 wherein each plate is secured by a plurality of screws which engage a single nut in the form of a plate having a plurality of threaded openings therein.

7. Apparatus as defined in claim 5 wherein the end portions of said spring fingers are constructed to engage the pilot flange during the tightening of the screws and nuts before the plates on which said fingers are carried are drawn into face-to-face engagement with the frame.

8. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from positions in which their spring fingers project inwardly beyond the cylindrical wall of said recess to positions in which the spring fingers lie wholly outside such wall, each said member having a part extending therefrom and accessible for moving the member radially from one of said positions to the other, and screws and nuts for holding the members in the first-named radial positions, each screw passing freely through the stator plate with its head engaging the outer face thereof and threading into its nut, each nut being operatively engaged with its member to draw the same toward said plate, the head of each screw being accessible from the outer face of the stator plate.

9. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from positions in which their fingers project inwardly beyond the cylindrical wall of said recess to positions in which the fingers lie wholly outside such wall, each said member having a part extending therefrom and accessible for moving the member radially from one of said positions to the other, and screws and nuts for drawing the members toward said plate to carry the fingers against the inner end face of the pilot flange, each screw passing freely through the stator plate with its head engaging the outer face thereof and threading into its nut, the nuts being operatively engaged with the members to draw the same toward the plate and carry the fingers against said inner end face of the pilot flange when the screws are tightened and thereby adjust the pressure of the fingers on said inner end face.

10. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from a position in which their fingers project inwardly beyond the cylindrical wall of said recess to a position in which the fingers lie wholly outside such wall, and screws and nuts for drawing the members toward said plate and the fingers against the inner end face of the pilot flange, each screw passing freely through the stator plate with its head engaging the outer face thereof and threading into its nut, said nuts being operatively engaged with their members to draw the latter toward the plate and the fingers against said inner end face of the pilot flange when the screws are tightened and thereby adjust the pressure of the fingers on said inner end face.

11. Apparatus as defined in claim 10 wherein the screws pass through elongated slots in said spring-finger carrying members whereby said members are guided in their radial movements.

12. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from positions in which their fingers project inwardly beyond the cylindrical wall of said recess to positions in which the fingers lie wholly outside such wall, each member having a bent part engageable with the pilot flange as a fulcrum, and screws and nuts for swinging said members about their fulcrums to press the fingers against the inner end face of the pilot flange, each screw passing freely through the stator plate with its head engaging the outer face thereof and threading into its nut, each nut being operatively engaged with its member to move its finger-carrying end toward and against said inner end face of the pilot flange when its screw is tightened, whereby to adjust the pressure of the fingers on said inner end face.

GLEN H. DINGMAN.

REFERENCES CITED

The following references are of record in the file of this patent:

UNITED STATES PATENTS

| Number | Name | Date |
|---|---|---|
| 1,113,147 | Zahringer | Oct. 6, 1914 |
| 1,610,033 | Hawkins | Jan. 4, 1927 |
| 2,363,436 | Pancoe | Nov. 21, 1944 |
| 2,487,095 | Brownlee | Nov. 8, 1949 |